United States Patent [19]
Ogawa et al.

[11] Patent Number: 5,713,197
[45] Date of Patent: Feb. 3, 1998

[54] CATALYST DETERIORATION-DETECTING SYSTEM FOR INTERNAL COMBUSTION ENGINES

[75] Inventors: Ken Ogawa; Hidehito Ikebe; Yoshikazu Oshima; Yasunori Ehara, all of Wako, Japan

[73] Assignee: Honda Giken Kogyo Kabushiki Kaisha, Tokyo, Japan

[21] Appl. No.: 533,209

[22] Filed: Sep. 25, 1995

[30] Foreign Application Priority Data

Sep. 26, 1994 [JP] Japan ................... 6-256223

[51] Int. Cl.$^6$ .................................. F01N 3/28
[52] U.S. Cl. ....................... 60/276; 60/277; 60/285
[58] Field of Search ................... 60/277, 276, 285

[56] References Cited

U.S. PATENT DOCUMENTS 5,201,173  4/1993  Fujimoto ................. 60/285
5,390,491  2/1995  Suzumura ................ 60/285

FOREIGN PATENT DOCUMENTS 2-30915  2/1990  Japan.

*Primary Examiner*—Douglas Hart
*Attorney, Agent, or Firm*—Nikaido, Marmelstein, Murray & Oram LLP

[57] ABSTRACT

There is provided a catalyst deterioration-detecting system for an internal combustion engine having at least one catalyst arranged in the exhaust passage, for purifying noxious components present in exhaust gases emitted from the engine, and an exhaust gas component concentration sensor arranged in the exhaust passage at a location downstream of the catalyst, for detecting concentration of a specific component in the exhaust gases. An ECU of the system controls the ignition timing of the engine, and detects the degree of deterioration of the catalyst, based on an output value from the exhaust gas component concentration sensor. The ignition timing of the engine is retarded in dependence on the detected degree of deterioration of the catalyst.

12 Claims, 12 Drawing Sheets

CATALYST DETERIORATION-DETECTING SYSTEM FOR INTERNAL COMBUSTION ENGINES

BACKGROUND OF THE INVENTION

1. Field of the Invention

This invention relates to a catalyst deterioration-detecting system for internal combustion engines, and more particularly to a catalyst deterioration-detecting system of this kind, which detects deterioration of a catalyst arranged in the exhaust system of the engine by the use of an output from an exhaust gas component concentration sensor arranged downstream of the catalyst, etc.

2. Prior Art

Conventional catalyst deterioration-detecting systems for internal combustion engines include a system which is disclosed in Japanese Laid-Open Patent Publication (Kokai) No. 2-30915. According to the disclosed system, a three-way catalyst is arranged in the exhaust system of an internal combustion engine, and two oxygen concentration sensors (hereinafter referred to as "the upstream O2 sensor" and "the downstream O2 sensor") as exhaust gas component concentration sensors are arranged in the exhaust system at respective locations upstream and downstream of the three-way catalyst. These O2 sensors have such an output characteristic that their output levels are inverted as the air-fuel ratio of a mixture supplied to the engine changes across a stoichiometric air-fuel ratio. The system according to the prior art detects deterioration of the three-way catalyst, based on a measured time period elapsed from the time the air-fuel ratio of the mixture changes to a rich value with respect to the stoichiometric air-fuel ratio to the time the output from the downstream O2 sensor is correspondingly inverted from a lean side to a rich side with respect to a reference output value, or a measured time period elapsed from the time the air-fuel ratio changes to a lean value with respect to the stoichiometric air-fuel ratio to the time the sensor output is correspondingly inverted from the rich side to the lean side.

More specifically, for example, a time period is measured, which has elapsed from a time point an output from the upstream O2 sensor changes to the rich side to a time point the output from the downstream O2 sensor is correspondingly inverted from the lean side to the rich side. Based upon the measured time period, it is determined whether or not the catalyst is deteriorated.

This deterioration-detecting technique is based upon the following ground:

A three-way catalyst in general has a so-called oxygen storage effect that it takes in oxygen when the air-fuel ratio lies on the lean side, whereas it takes in CO and HC in exhaust gases emitted from the engine when the air-fuel ratio lies on the rich side. As the oxygen storage effect is greater, a time difference between a time point of a change in the air-fuel ratio of exhaust gases in the exhaust system upstream of the catalyst and a time point of a corresponding change in the air-fuel ratio of exhaust gases downstream of the catalyst becomes larger. The above-mentioned measured time period represents this time difference. The oxygen storage effect becomes smaller as the degree of deterioration of the catalyst is larger, so that the measured time period becomes shorter. Therefore, when the measured time period is shorter than a predetermined time period, it can be judged that the oxygen storage effect is degraded, i.e. the catalyst is deteriorated.

However, the conventional catalyst deterioration-detecting system is not provided with means operable when the deterioration of the catalyst is thus detected, for restraining an increase in the amount of noxious components in exhaust gases, such as HC, CO and NOx, emitted from the engine. Therefore, it is impossible to prevent emission of an increased amount of noxious components, which degrades exhaust emission characteristics of the engine, when the catalyst is deteriorated.

SUMMARY OF THE INVENTION

It is the object of the invention to provide a catalyst deterioration-detecting system for an internal combustion engine, which is capable of restraining degradation of exhaust emission characteristics of the engine, when a catalyst of the engine is deteriorated.

To attain the above object, the present invention provides a catalyst deterioration-detecting system for an internal combustion engine having an exhaust passage, at least one catalyst means arranged in the exhaust passage for purifying noxious components present in exhaust gases emitted from the engine, exhaust gas component concentration sensor means arranged in the exhaust passage at a location downstream of the catalyst means, for detecting concentration of a specific component in the exhaust gases, and ignition timing control means for controlling ignition timing of the engine, the system comprising:

catalyst deterioration-detecting means for detecting a degree of deterioration of the catalyst means, based on an output value from the exhaust gas component concentration sensor means; and ignition timing-retarding means for retarding ignition timing of the engine in dependence on the degree of deterioration of the catalyst means detected by the catalyst deterioration-detecting means.

Noxious components, such as HC, CO, and NOx, emitted from the engine to be supplied to the catalyst decrease in amount with retardation of the ignition timing of the engine. The decrease of the amount of noxious components does not lead to decrease of the degree of deterioration of the catalyst per se. However, according to the catalyst deterioration-detecting system of the invention constructed as above, by retarding the ignition timing, an increase in the amount of the noxious components finally emitted through the catalyst into the atmosphere can be restrained.

Preferably, the ignition timing-retarding means calculates an ignition timing retardation amount according to the degree of deterioration of the catalyst means detected by the catalyst deterioration-detecting means, and limits the calculated ignition timing retardation amount to a predetermined limit value when the calculated ignition timing retardation amount exceeds the predetermined limit value.

As a result, an excessive drop in the engine output can be avoided to thereby maintain required drivability of the engine.

More preferably, the catalyst deterioration-detecting system includes catalyst deterioration-displaying means for displaying the degree of deterioration of the catalyst means detected by the catalyst deterioration-detecting means when the calculated ignition timing retardation amount exceeds the predetermined limit value.

As a result, the driver can be informed of the degree of deterioration of the catalyst.

Further preferably, the catalyst deterioration-detecting system includes high load condition-detecting means for detecting a predetermined high load condition of the engine, and retardation-inhibiting means for inhibiting the ignition timing retardation when the predetermined high load condition of the engine is detected by the high load condition-detecting means.

As a result, an excessive rise in the temperature of exhaust gases supplied to the catalyst can be restrained, to thereby prevent overheating of the catalyst.

Also preferably, the catalyst deterioration-detecting system includes retardation amount-storing means for storing the ignition timing retardation amount calculated by the ignition timing-retarding means, and retardation amount-updating means for updating the ignition timing retardation amount stored by the retardation amount-storing means when a difference between the ignition timing retardation amount stored by the retardation amount-storing means and an ignition timing retardation amount newly calculated by the ignition timing-retarding means exceeds a predetermined value.

As a result, even if the operation of the engine is stopped, the optimum ignition timing retardation can be achieved immediately after the start of the operation of the engine. Further, the optimum ignition timing retardation amount can be always obtained.

Preferably, the catalyst deterioration-detecting means includes average value-calculating means for calculating an average value of the output value from the exhaust gas component concentration-detecting means, and fluctuation width-calculating means for calculating a fluctuation width of the output value from the exhaust gas component concentration-detecting means, the catalyst deterioration-detecting means detecting the degree of deterioration of the catalyst means, based on at least one of the average value and the fluctuation width thus calculated.

As a result, it is possible to carry out the catalyst deterioration detection at the same time of execution of the air-fuel ratio feedback control performance, without interrupting the air-fuel ratio feedback control.

More preferably, the ignition timing-retarding means calculates the ignition timing retardation amount, based on at least one of the average value calculated by the average value-calculating means and the fluctuation width calculated by the fluctuation width-calculating means.

Specifically, the ignition timing-retarding means sets the ignition timing retardation amount to a larger value as the average value calculated by the average value-calculating means is smaller.

Also, the ignition timing-retarding means sets the ignition timing retardation amount to a larger value as the fluctuation width calculated by the fluctuation width-calculating means is larger.

As a result, the same parameters are used not only for detection of the deterioration of the catalyst but also for calculation of the ignition timing retardation amount, so that the construction of the system can be simplified.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
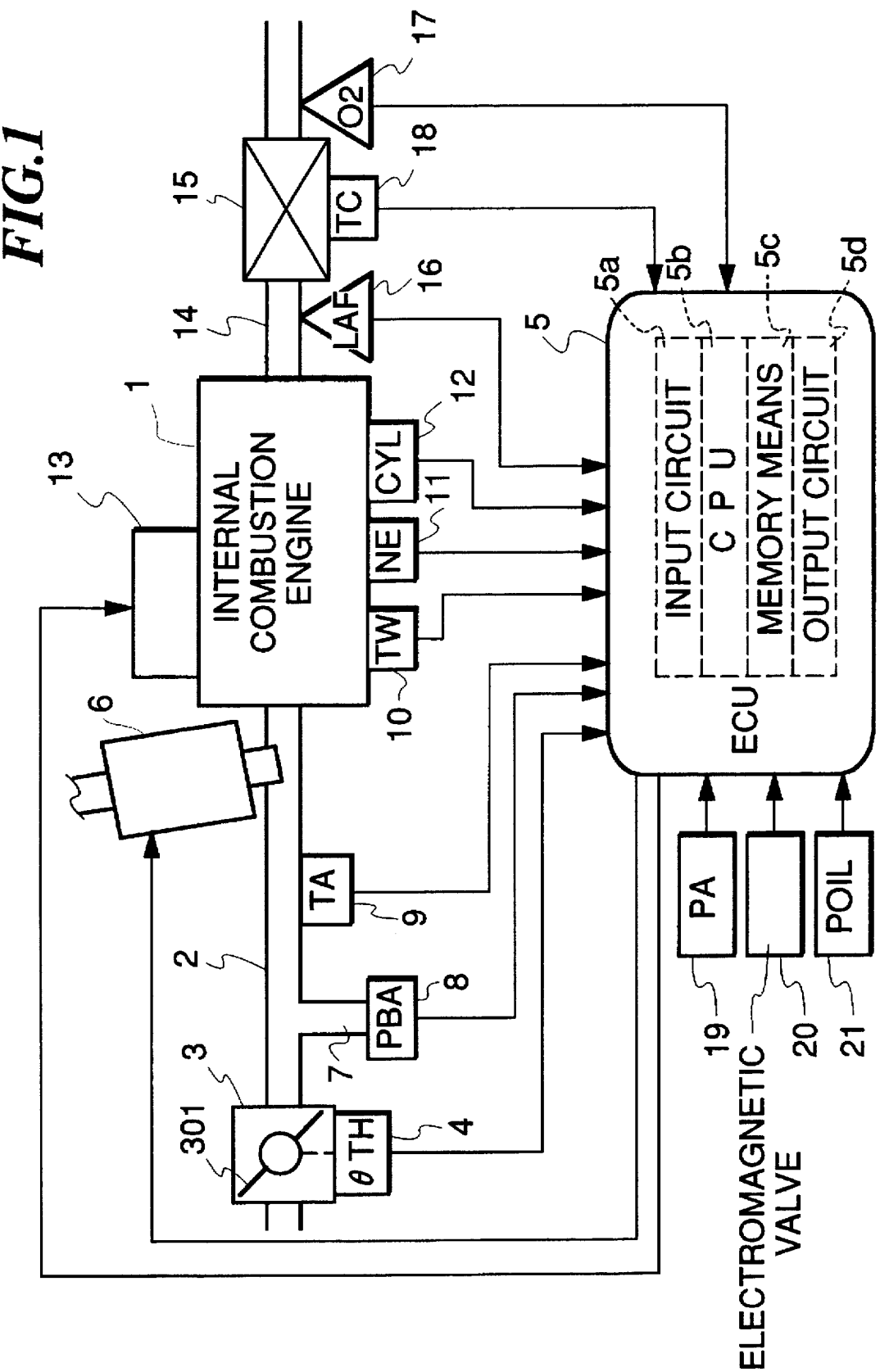
FIG. 1 is a block diagram showing the whole arrangement of an internal combustion engine and a catalyst deterioration-detecting system therefor, according to an embodiment of the invention.

Referring first to FIG. 1, there is schematically illustrated the whole arrangement of an internal combustion engine and a catalyst deterioration-detecting system incorporated therein, according to an embodiment of the invention. In the figure, reference numeral 1 designates a DOHC straight type four-cylinder engine (hereinafter simply referred to as "the engine"), each cylinder being provided with a pair of intake valves and a pair of exhaust valves, not shown. Connected to the cylinder block of the engine 1 is an intake pipe 2 across which is arranged a throttle body 3 accommodating a throttle valve 301 therein. A throttle valve opening ($\theta TH$) sensor 4 is connected to the throttle valve 301 for generating an electric signal indicative of the sensed throttle valve opening and supplying the same to an electronic control unit (hereinafter referred to as "the ECU") 5.

Fuel injection valves 6, only one of which is shown, are each provided for each of the cylinders, which are inserted into the interior of the intake pipe 2 at locations intermediate between the cylinder block of the engine 1 and the throttle valve 301. The fuel injection valves 6 are connected to a fuel pump, not shown, and electrically connected to the ECU 5 to have their valve opening periods controlled by signals therefrom.

Further, an intake pipe absolute pressure (PBA) sensor 8 is provided in communication with the interior of the intake pipe 2 via a conduit 7 opening into the intake pipe 2 at a location downstream of the throttle valve 301, for supplying an electric signal indicative of the sensed absolute pressure within the intake pipe 2 to the ECU 5.

An intake air temperature (TA) sensor 9 is inserted into the interior of the intake pipe 2 at a location downstream of the conduit 7 for supplying an electric signal indicative of the sensed intake air temperature TA to the ECU 5.

An engine coolant temperature (TW) sensor 10 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown.

The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

Each cylinder of the engine has a spark plug 13 electrically connected to the ECU 5 to have its ignition timing controlled by a signal therefrom.

A catalytic converter formed by a three-way catalyst (hereinafter referred to as "the catalyst") 15 is arranged in an exhaust pipe 14 of the engine 1, for purifying noxious components, such as HC, CO and NOx, which are present in exhaust gases from the engine. Arranged in a peripheral wall of the catalyst 15 is a catalyst temperature (TC) sensor 18 formed of a thermistor or the like, which supplies a signal indicative of the sensed catalyst temperature TC to the ECU 5.

A LAF sensor 16 as a first exhaust gas component concentration sensor is arranged in the exhaust pipe 14 at a location upstream of the catalyst 15, and an O2 sensor 17 as a second exhaust gas component concentration sensor is arranged in the exhaust pipe 14 at a location downstream of the catalyst 15.

The LAF sensor 16 has a sensor element formed of a solid electrolytic material of zirconia (ZrO2) or the like, and two pairs of a cell element and an oxygen-pumping element mounted on the sensor element at predetermined locations, the pairs being vertically arranged at respective upper and lower locations. The sensor element is electrically connected to an amplifier circuit, not shown. The LAF sensor 16 generates an electric signal substantially proportional to the concentration of oxygen in exhaust gases passing the interior of the sensor element, which signal is supplied to the ECU 5.

The O2 sensor 17 also has a sensor element formed of a solid electrolytic material of zirconia (ZrO2) having a characteristic that an electromotive force thereof drastically or suddenly changes when the air-fuel ratio of the exhaust gases changes across the stoichiometric value, so that an output from the O2 sensor 17 is inverted from a lean value-indicative level to a rich value-indicative level, or vice versa, when the air-fuel ratio changes across the stoichiometric value. More specifically, the O2 sensor 17 generates a high level signal when the air-fuel ratio of the exhaust gases is rich, and a low level signal when it is lean.

An atmospheric pressure (PA) sensor 19 is arranged at a suitable location of the engine 1 and supplies an electric signal indicative of the sensed atmospheric pressure PA to the ECU 5.

Connected to an output side of the ECU 5 is an electromagnetic valve 20 for controlling changeover of the valve timing (V/T) of the intake valves and exhaust valves, valving operation of which is controlled by a signal from the ECU 5. The electromagnetic valve 20 selects either high or low hydraulic pressure applied to a valve timing changeover device, not shown, for actuation thereof. Responsive to this high or low hydraulic pressure, the valve timing changeover device operates to change the valve timing to either a high-speed V/T or a low-speed V/T. The hydraulic pressure applied to the valve timing changeover device is detected by a hydraulic pressure (POIL) sensor 21 which supplies a signal indicative of the sensed hydraulic pressure to the ECU 5.

The ECU 5 comprises an input circuit 5$a$ having the functions of shaping the waveforms of input signals from various sensors including ones mentioned above, shifting the voltage levels of sensor output signals to a predetermined level, converting analog signals from analog-output sensors to digital signals, and so forth, a central processing unit (hereinafter referred to as the "the CPU") 5$b$, memory means 5$c$ formed of a ROM storing various operational programs which are executed by the CPU 5$b$, and various maps and tables, referred to hereinafter, and a RAM for storing results of calculations therefrom, etc., and an output circuit 5$d$ which outputs driving signals to the fuel injection valves 6 and the spark plugs 23.

The CPU 5$b$ operates in response to the signals from various sensors described above to determine operating conditions in which the engine 1 is operating, such as an air-fuel ratio feedback control region and open-loop control regions, and calculates, based upon the determined engine operating conditions, the valve opening period or fuel injection period TOUT over which the fuel injection valves 6 are to be opened, by the use of the following equation (1) when the engine is in a basic operating mode, and by the use of the following equation (2) when the engine is in a starting mode, in synchronism with generation of TDC signal pulses, and stores the results of calculation into the memory means 5$c$ (RAM):

$$TOUT = TiM \times KCMDM \times KLAF \times K1 + K2 \quad (1)$$

$$TOUT = TiCR \times K3 + K4 \quad (2)$$

where TiM represents a basic fuel injection period applied when the engine is in the basic operating mode, which is determined according to the engine rotational speed NE and the intake pipe absolute pressure PBA. A TiM map used in determining a value of TiM is stored in the ROM of the memory means 5$c$.

TiCR represents a basic fuel injection period applied when the engine is in the starting mode, which is determined according to the engine rotational speed NE and the intake pipe absolute pressure PBA, similarly to TiM. A TiCR map used in determining a value of TiCR is stored in the ROM of the memory means 5$c$, as well.

KCMDM represents a modified desired air-fuel ratio coefficient, which is set based on a desired air-fuel ratio coefficient KCMD determined based on operating conditions of the engine as well as on an air-fuel ratio correction value $\Delta$KCMD determined based on an output from the O2 sensor 17, as will be described later.

KLAF represents an air-fuel ratio correction coefficient, which is set during the air-fuel ratio feedback control such that the air-fuel ratio detected by the LAF sensor 16 becomes equal to a desired air-fuel ratio set by the KCMDM value, while it is set during the open-loop control to predetermined values depending on operating conditions of the engine.

K1 and K3 represent correction coefficients and K2 and K4 represent correction variables. The correction coefficients and variables K1 to K4 are set depending on operating conditions of the engine to such values as optimize operating characteristics of the engine, such as fuel consumption and accelerability.

Further, the CPU 5b calculates the ignition timing of the engine according to operating conditions of the engine, referred to hereinafter, and drives the spark plug 13, based on the calculated ignition timing.

Figure 2:
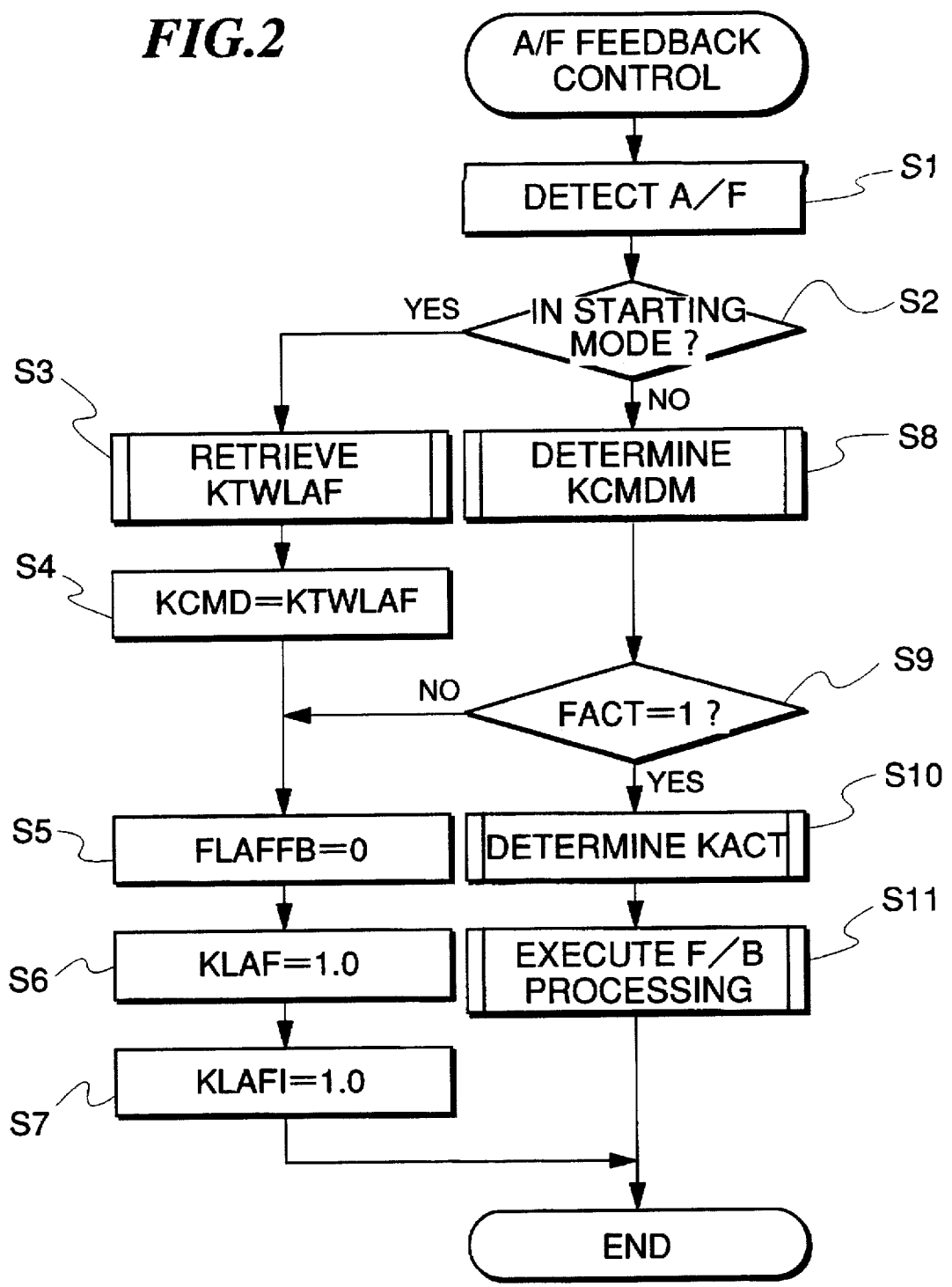
FIG. 2 is a flowchart showing a main routine for carrying out air-fuel ratio feedback control according to the embodiment.

FIG. 2 shows a main routine for carrying out the air-fuel ratio feedback control.

First, at a step S1, an output value from the LAF sensor 16 is read in. Then, at a step S2, it is determined whether or not the engine is in the starting mode. The determination as to whether the engine is in the starting mode is carried out by determining whether or not a starter switch, not shown, of the engine has been turned on, and at the same time the engine rotational speed NE is below a predetermined value (cranking speed).

If the answer to the question at the step S2 is affirmative (YES), i.e. if the engine is in the starting mode, which implies that the engine temperatures is low, a value of a desired air-fuel ratio coefficient KTWLAF suitable for low engine temperature is determined at a step S3 by retrieving a KTWLAF map according to the engine coolant temperature TW and the intake pipe absolute pressure PBA, and the determined KTWLAF value is set to the desired air-fuel ratio coefficient KCMD at a step S4. Then, a flag FLAFFB is set to "0" at a step S5 to inhibit execution of the air-fuel ratio feedback control, and the air-fuel ratio correction coefficient KLAF and an integral term (I term) thereof KLAFI are both set to 1.0 at respective steps S6 and S7, followed by terminating the program.

On the other hand, if the answer to the question at the step S2 is negative (NO), i.e. if the engine is in the basic operating mode, the modified desired air-fuel ratio coefficient KCMDM is determined at a step S8 by a KCMDM-determining routine described hereinafter with reference to FIG. 3, and then it is determined at a step S9 whether or not a flag FACT is set to "1" in order to judge whether or not the LAF sensor 16 has been activated. The determination as to whether the LAF sensor 16 has been activated is carried out by the use of another routine, not shown, which is executed as background processing, in which when the difference between an actual value VOUT of the output voltage from the LAF sensor 16 and a predetermined central voltage value VCENT of the same is smaller than a predetermined value (e.g. 0.4 V), for instance, it is determined that the LAF sensor 16 has been activated.

If the answer to the question at the step S9 is negative (NO), the program proceeds to the step S5, whereas if the answer to the question at the step S9 is affirmative (YES), i.e. if the LAF sensor 16 has been activated, the program proceeds to a step S10, wherein an equivalent ratio KACT (14.7/(A/F)) of the air-fuel ratio detected by the LAF sensor 16 (hereinafter referred to as "the detected air-fuel ratio coefficient") is calculated. The detected air-fuel ratio coefficient KACT is calculated by the use of a KACT-calculating routine, not shown. Then, at a step S11, a feedback processing routine is executed, followed by terminating the program. More specifically, if predetermined feedback control conditions are not satisfied, the flag FLAFFB is set to "0" to inhibit execution of the air-fuel ratio feedback control, whereas if the predetermined feedback control conditions are satisfied, the flag FLAFFB is set to "1", and the air-fuel ratio correction coefficient KLAF is calculated to execute the air-fuel ratio feedback control, followed by terminating the program.

Figure 3:
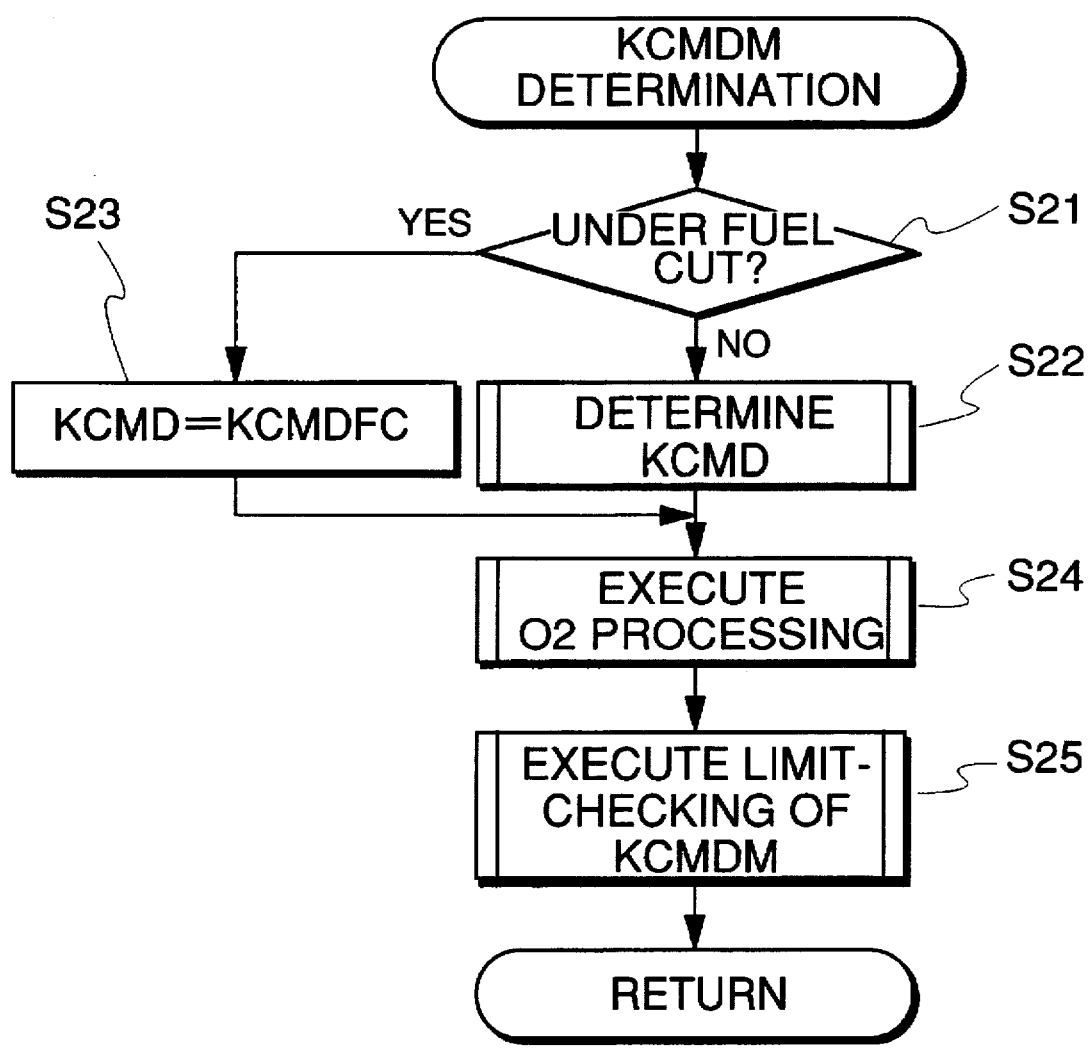
FIG. 3 is a flowchart showing a subroutine for determining a modified desired air-fuel ratio coefficient KCMDM applied during the air-fuel ratio feedback control.

FIG. 3 shows the KCMDM-determining routine executed at the step S8 in FIG. 2, which is executed in synchronism with generation of TDC signal pulses.

First, at a step S21, it is determined whether or not the engine is under fuel cut, i.e. the fuel supply is interrupted. The determination as to fuel cut is carried out based on the engine rotational speed NE and the valve opening θTH of the throttle valve 301, by a fuel cut-determining routine, not shown.

If the answer is negative (NO), i.e. if the engine is in the basic operating mode, the desired air-fuel ratio coefficient KCMD is determined at a step S22, followed by the program proceeding to a step S24. The desired air-fuel ratio coefficient KCMD is normally read from a KCMD map, not shown, according to the engine rotational speed NE and the intake pipe absolute pressure PBA. When a vehicle on which the engine is installed is started from its standing position, or when the engine is in a cold condition, or in a predetermined high load condition, a map value read from the KCMD map is corrected to a suitable value. More specifically, the KCMD value is determined by executing a KCMD-determining routine, not shown.

On the other hand, if the answer to the question at the step S21 is affirmative (YES), the desired air-fuel ratio coefficient KCMD is set to a predetermined value KCMDFC (e.g. 1.0) at a step S23, and then the program proceeds to the step S24.

At the step S24, an O2 sensor output processing is carried out. That is, as described hereinafter, when predetermined conditions are satisfied, the desired air-fuel ratio coefficient KCMD is corrected based on the output value from the O2 sensor 17 to obtain a value of the modified desired air-fuel ratio coefficient KCMDM. Then, at a step S25 limit-checking of the modified desired air-fuel ratio coefficient KCMDM is carried out, followed by terminating the present subroutine to return to the FIG. 2 main routine. More specifically, the KCMDM value calculated at the step S22 is compared with predetermined upper and lower limit values KCMDMH and KCMDML, and if the KCMDM value is larger than the predetermined upper limit value KCMDMH, the former is corrected to the latter, whereas if the KCMDM value is smaller than the predetermined lower limit value KCMDML, the former is corrected to the latter.

Figure 4:
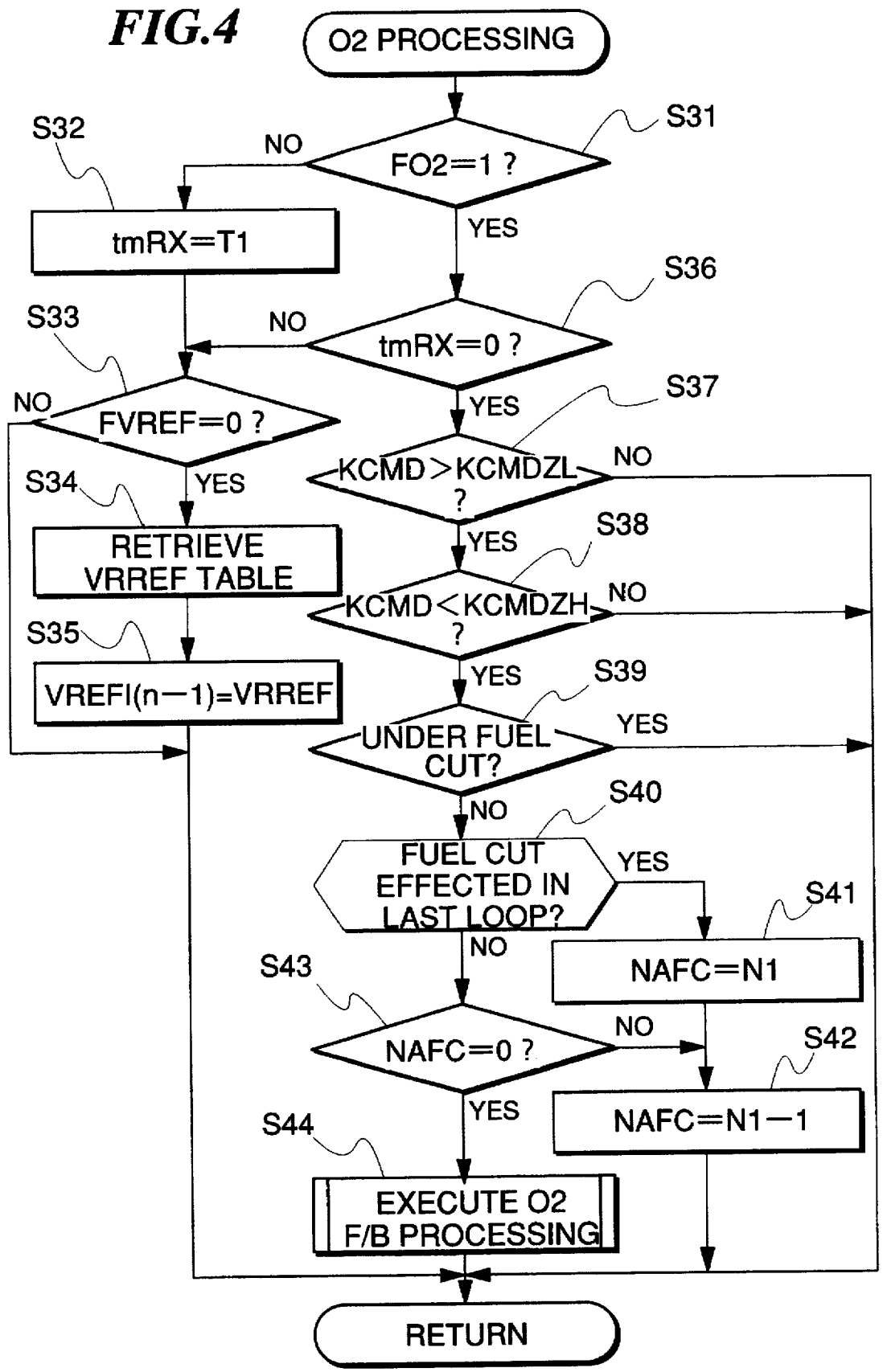
FIG. 4 is a flowchart showing an O2 sensor output-processing routine executed during the air-fuel ratio feedback control.

FIG. 4 shows an O2 sensor output-processing routine, which is executed at the step S24 in FIG. 3, in synchronism with generation of TDC signal pulses.

First, at a step S31, it is determined whether or not a flag FO2 is set to "1" to determine whether the O2 sensor 17 has been activated. The determination as to activation of the O2 sensor 17 is carried out by an O2 sensor activation-determining routine, not shown, which is executed as background processing. For example, whether or not the O2 sensor 17 is activated is determined depending on a time period elapsed after an ignition switch, not shown, of the engine is turned on, or on a time period elapsed after the engine enters the basic operating mode.

If the answer is negative (NO), i.e. if it is determined that the O2 sensor 17 has not been activated, the program proceeds to a step S32, wherein a timer tmRX is set to a predetermined value T1 (e.g. 0.25 sec.), and then it is determined at a step S33 whether or not a flag FVREF is equal to "0" to thereby determine whether or not a desired value VREF of the output voltage VO2 from the O2 sensor 17, referred to later, for calculation of the air-fuel ratio correction value ΔKCMD has been set to an initial value (hereinafter referred to as "the initial desired value") VRREF thereof.

In the first loop of execution of the present routine, the initial desired value VRREF has not been set, and therefore the answer to the question at the step S33 is affirmative (YES) (FVREF=0). Then, the program proceeds to a step S34, wherein a VRREF table, not shown, stored in the ROM of the memory means 5c is retrieved to determine the initial desired value VRREF.

The VRREF table is set in accordance with the atmospheric pressure PA sensed by the PA sensor 19. The initial desired value VRREF is determined by being read from the VRREF table and additionally by interpolation, if required.

Then, at a step S35, an integral term (I term) VREFI(n−1) of the desired value VREF in the immediately preceding loop is set to the initial desired value VRREF, and then the present subroutine is terminated to return to the FIG. 2 main routine. If the step S33 is executed in the next or a subsequent loop, the answer to the question at the step S33 is negative (NO), since the desired value VREF has already been set to the initial desired value VRREF as described above, so that the present routine is immediately terminated without executing the steps S34 and S35.

On the other hand, if the answer to the question at the step S31 is affirmative (YES), it is judged that the O2 sensor 17 has been activated, and then the program proceeds to a step S36, wherein it is determined whether or not the count value of the timer tmRX is equal to "0". If the answer is negative (NO), the program proceeds to the step S33, whereas if the answer is affirmative (YES), it is judged that the activation of the O2 sensor 17 has been completed, and then the program proceeds to a step S37, wherein it is determined whether or not the desired air-fuel ratio coefficient KCMD set at the step S22 or S23 in FIG. 3 is larger than a predetermined lower limit value KCMDZL (e.g. 0.98). If the answer is affirmative (YES), it is determined at a step S38 whether or not the KCMD value is smaller than a predetermined upper limit value KCMDZH (e.g. 1.13).

If the answer to the question at the step S37 or S38 is negative (NO), which means that the air-fuel ratio of the mixture has been set to a so-called lean-burn state or to a so-called fuel rich state, and then the present routine is immediately terminated. On the other hand, if the answers at the step S38 is affirmative (YES), it is judged that the air-fuel ratio of the mixture is to be controlled to the stoichiometric value (A/F=14.7), so that the program proceeds to a step S39, wherein it is determined whether or not the engine is under fuel cut. If the answer is affirmative (YES), the present routine is immediately terminated to return to the FIG. 2 main routine, whereas if the answer is negative (NO), it is determined at a step S40 whether or not the engine was under fuel cut in the immediately preceding loop. If the answer is affirmative (YES), the count value of a counter NAFC is set to a predetermined value N1 (e.g. 4) at a step S41, and the count value of the counter NAFC is decremented by "1" at a step S42, followed by terminating the present routine.

On the other hand, if the answer to the question at the step S40 is negative (NO), the program proceeds to a step S43, wherein it is determined whether or not the count value of the counter NAFC is equal to "0". If the answer is negative (NO), the count value of the counter NAFC is decremented by "1" at a step S42, followed by terminating the present routine. On the other hand, if the answer is affirmative (YES), it is judged that the fuel supply has been stabilized after termination of the fuel cut, and therefore the program proceeds to a step S44, wherein the O2 feedback processing, described hereinafter, is executed, followed by terminating the present routine to return to the FIG. 2 main routine.

Figure 5:
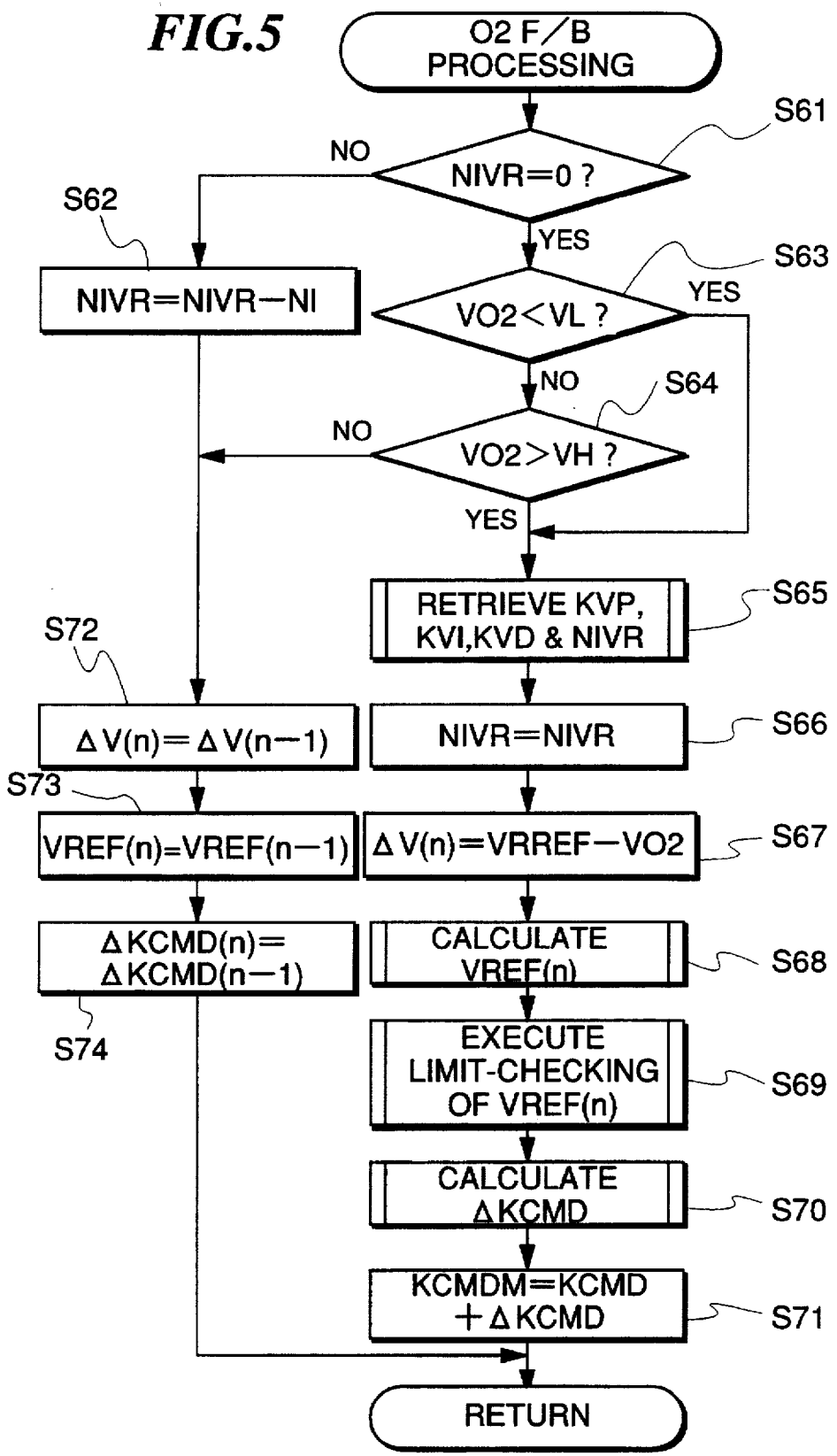
FIG. 5 is a flowchart showing an O2 feedback processing (O2 sensor output-responsive air-fuel ratio feedback control) routine executed during the air-fuel ratio feedback control.

FIG. 5 shows an O2 feedback processing routine which is executed at the step S44 in FIG. 4, in synchronism with generation of TDC signal pulses.

First, at a step S61, it is determined whether or not a thinning-out variable NIVR is equal to "0". The thinning-out variable NIVR is reduced by a thinning-out number NI, which is set depending on operating conditions of the engine as will be described later, in synchronism with generation of TDC signal pulses. In the first loop of execution of the present routine, the answer to the question at the step S61 is affirmative (YES), so that the program proceeds to a step S63.

If the answer to the question at the step S61 becomes negative (NO) in a subsequent loop, the program proceeds to a step S62, wherein the thinning-out number NI (e.g. 1) is subtracted from the thinning-out variable NIVR, and the thus calculated value is set to a new value of the thinning-out variable NIVR, followed by the program proceeding to a step S72, referred to hereinafter.

At the step S63, it is determined whether or not the output voltage VO2 from the O2 sensor 17 is lower than a predetermined lower limit value VL (e.g. 0.3 V). If the answer is affirmative (YES), it is judged that the air-fuel ratio of the mixture is deviated from the stoichiometric value to a leaner value, so that the program proceeds to a step S65, whereas if the answer is negative (NO), the program proceeds to a step S64, wherein it is determined whether or not the output voltage VO2 from the O2 sensor 17 is higher than a predetermined upper limit value VH (e.g. 0.8). If the answer to this question is affirmative (YES), it is judged that the air-fuel ratio of the mixture is deviated from the stoichiometric value to a richer value, so that the program proceeds to the step S65.

At the step S65, a KVP map, a KVI map, a KVD map, and an NIVR map, none of which are shown, are retrieved to determine a proportional term (P term) coefficient KVP, an integral term (I term) coefficient KVI, and a differential term (D term) coefficient KVD, and the aforementioned thinning-out number NIVR. The KVP map, the KVI map, the KVD map, and the NIVR map are set such that predetermined map values are provided, respectively, for a plurality of engine operating regions determined by the engine rotational speed NE and the intake pipe absolute pressure PBA. The KVP, KVI, KVD, and NIVR values are determined by being read from the respective maps and additionally by interpolation, if required.

Then, at a step S66, the thinning-out variable NIVR is set to the number NIVR determined at the step S65, and then the program proceeds to a step S67, wherein calculation is made of a difference ΔV(n) between the initial desired value VRREF determined at the step S34 in FIG. 4 and the output voltage VO2 from the O2 sensor 17 detected in the present loop.

Then, at a step S68, desired values VREFP(n), VREFI(n), and VREFD(n) of the respective correction terms, i.e. P term, I term, and D term, are calculated by the use of the following equations (3) to (5):

$$VREFP(n) = \Delta V(n) \times KVP \quad (3)$$

$$VREFI(n) = VREF(n-1) + \Delta V(n) \times KVI \quad (4)$$

$$VREFD(n) = (\Delta V(n) - \Delta V(n-1)) \times KVD \quad (5)$$

Then, these calculated desired values are added together by the use of the following equation (6) to determine the desired value VREF(n) of the output voltage VO2 from the O2 sensor 17 to be used in the O2 feedback control, at the step S68:

$$VREF(n) = VREFP(n) + VREFI(n) + VREFD(n) \quad (6)$$

Then, at a step S69, limit-checking of the desired value VREF(n) is carried out. Specifically, the value VREF(n) is compared with predetermined upper and lower limit values VREFH, VREFL. When the value VREF(n) exceeds the higher limit value VREFH, the former is set to the latter, while when the VREF(n) value is below the lower limit value VREFL, the former is set to the latter.

Following the limit-checking of the desired value VREF (n), the program proceeds to a step S70, wherein the air-fuel ratio correction value ΔKCMD is determined by retrieving a ΔKCMD table, not shown. More specifically, the ΔKCMD table is set such that table values ΔKCMD0 to ΔKCMD3 are provided in a manner corresponding, respectively, to desired correction values VREF0 to VREF5. The ΔKCMD value is determined by being read from the map and additionally by interpolation, if required. A larger ΔKCMD value is read as the VREF(n) value becomes larger. Since the VREF value is subjected to limit-checking at the step S69, the ΔKCMD value read falls between predetermined upper and lower limit values.

Then, at a step S71, the air-fuel ratio correction value ΔKCMD is added to the desired air-fuel ratio correction coefficient KCMD determined at the step S22 in FIG. 3 to obtain the modified desired air-fuel ratio coefficient KCMDM (equivalent to the stoichiometric air-fuel ratio in the present embodiment), followed by terminating this routine.

On the other hand, if the answers to the questions of the steps S63 and S64 are both negative (NO), i.e. if the output voltage VO2 from the O2 sensor 17 is equal to or higher than the predetermined lower limit value VL but equal to or lower than the predetermined higher limit value VH, i.e. if VL≦VO2≦VH, execution of the O2 feedback control is inhibited, and hence the program proceeds to steps S72 to S74, wherein the aforementioned difference ΔV (between VRREF and VO2), the desired value VREF, and the air-fuel ratio correction value ΔKCMD are held at the respective values assumed in the immediately preceding loop, followed by terminating the program. This prevents the O2 feedback control from being unnecessarily carried out when the air-fuel ratio of the mixture is determined to remain substantially equal to the stoichiometric value, to thereby attain excellent controllability, that is, stabilize the air-fuel ratio of the mixture.

Next, details of the method of detecting deterioration of the catalyst 15 according to the present embodiment will be described with reference to FIGS. 6 and 7.

First, description will be made of the principle of the manner of detection of the catalyst deterioration employed by the catalyst deterioration-detecting system according to the invention. When a new catalyst is employed, the O2 sensor shows a relatively high average output value with a very small fluctuation width. On the other hand, when the vehicle has traveled about 80,000 km, the O2 sensor output shows a lower average value and has a larger fluctuation width. When the vehicle has traveled about 160,000 km, the O2 sensor output shows a still lower average value with a further increased fluctuation width. In the case where feed gas is directly supplied to the O2 sensor, the average output value from the O2 sensor lowers to a level about half of the level in the case of the new catalyst, and has a very large fluctuation width.

The average output value from the O2 sensor is considered to correspond to oxygen partial pressure prevailing downstream of the catalyst, i.e. the oxidizing capacity of the catalyst. Therefore, the output fluctuation width of the O2 sensor can be considered to correspond to a degree of change in the oxygen storage capacity of the catalyst. That is, as the oxidizing capacity of the catalyst lowers, the average output value from the O2 sensor becomes lower, and as the degree of deterioration of the catalyst increases, the oxygen storage capacity of the catalyst becomes lower so that the output fluctuation width of the O2 sensor increases.

The present invention is based on the above described principle, and utilizes an average value of an output from a second exhaust gas component concentration sensor downstream of a catalyst and a fluctuation width thereof, for evaluation of the degree of deterioration of the catalyst.

Figure 6:
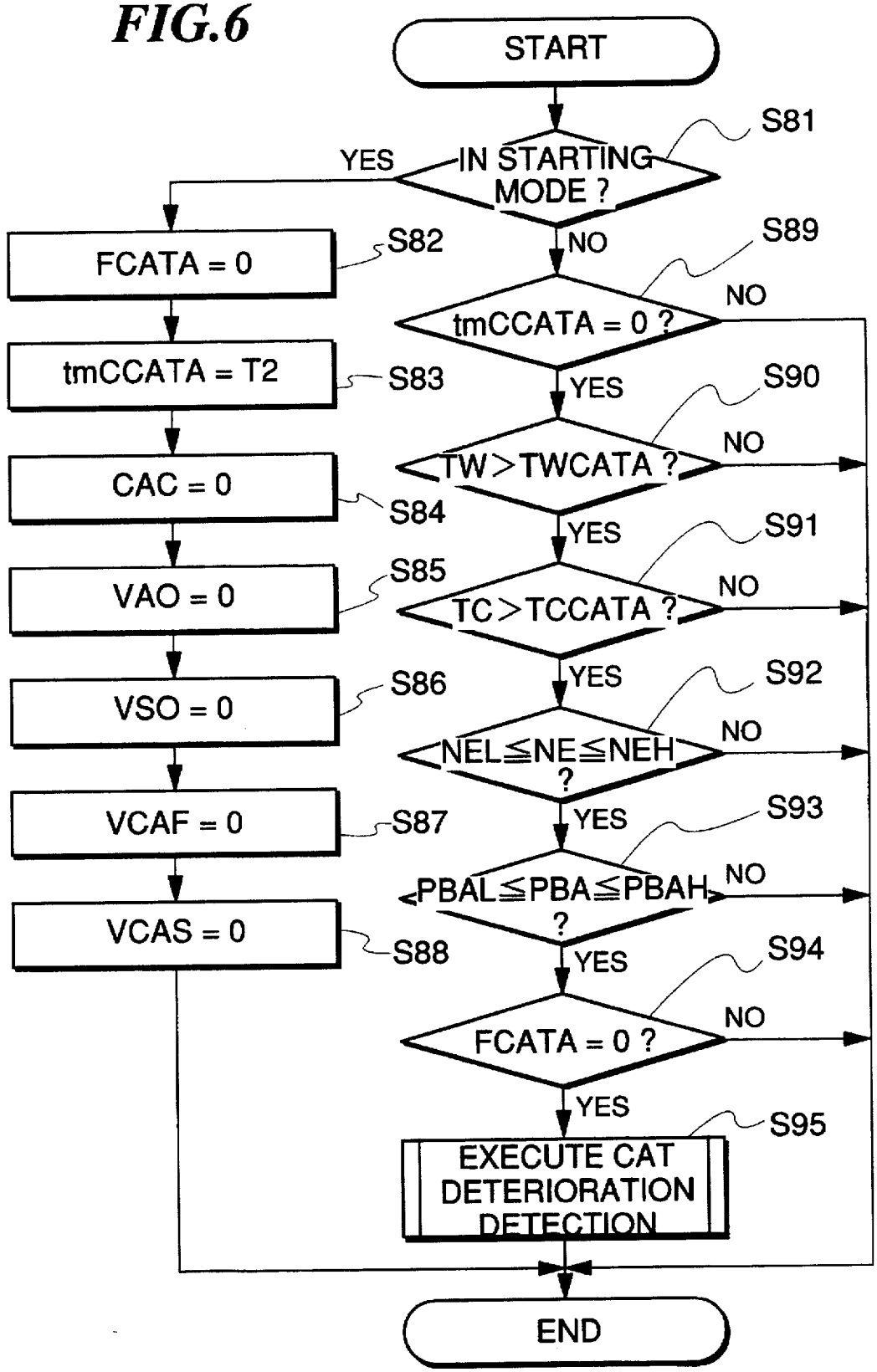
FIG. 6 is a flowchart showing a main routine for carrying out detection of deterioration of a catalyst appearing in FIG. 1.

FIG. 6 shows a main routine for carrying out detection of deterioration of the catalyst, which is based on the principle described above and executed by the CPU 5b, in synchronism with generation of TDC signal pulses.

First, at a step S81, it is determined whether or not the engine is in the starting mode. This determination is made in a similar manner to that at the step S2 in FIG. 2.

If the answer is affirmative (YES), i.e. if the engine is in the starting mode, the catalyst deterioration detection is not carried out, but a deterioration detection flag FCATA is set to "0" at a step S82, and a timer tmCCATA which measures a time period elapsed from the start of the engine is set to a predetermined time period T2 (e.g. 120 sec) at a step S83. Then, a determination time period variable CAC for calculation of the average value, etc., an average value VAO of the output value VO2 from the O2 sensor 17, a variance value VSO, an integrated value VCAF of the output value VO2, and a squared integrated value VCAS of the output VO2 are all set to "0" at steps S84 to S88, followed by terminating the routine.

On the other hand, if the answer to the question at the step S81 is negative (NO), i.e. if the engine is in the basic operating mode, it is determined at a step S89 whether or not the timer tmCCATA has been set to "0". If the answer is affirmative (YES), which means that the predetermined time period T2 has already elapsed, and then it is determined at a step S90 whether or not the engine coolant temperature TW sensed by the TW sensor 10 is higher than a predetermined lower limit value TWCATA (e.g. 80° C.). If the answer is affirmative (YES), it is judged that the engine has been warmed up, and then it is determined at a step S91 whether or not the catalyst bed temperature TC sensed by the TC sensor 18 is higher than a predetermined lower limit value TCCATA (e.g. 380° C.) If the answer is affirmative (YES), it is determined that the catalyst 15 has been activated, and then the program proceeds to a step S92, wherein it is determined whether or not the engine rotational speed NE sensed by the NE sensor 11 falls within a predetermined range defined by a predetermined lower limit NEL (e.g. 1800 rpm) and a predetermined higher limit NEH (e.g. 3000 rpm). If the answer is affirmative (YES), which means that one of parameter conditions for determining an engine steady operating condition is satisfied, and then it is then determined at a step S93 whether or not the intake pipe absolute pressure PBA sensed by the PBA sensor 8 falls within a predetermined range defined by a predetermined lower limit PBAL (e.g. 260 mmHg) and a predetermined higher limit PBAH (e.g. 560 mmHg).

If the answer to the question at the step S93 is affirmative (YES), which means that a load condition satisfying the engine steady operating condition is satisfied, and then the program proceeds to a step S94, wherein it is determined whether or not the deterioration detection flag FCATA is set to "0". If the answer is affirmative (YES), i.e. if the catalyst deterioration detection has not yet been carried out, a catalyst deterioration-detecting routine of FIG. 7 is executed at a step S95, followed by terminating the program.

If the answer to the question of any of the steps S89 to S94 is negative (NO), the program is immediately terminated without carrying out the catalyst deterioration detection.

Figure 7:
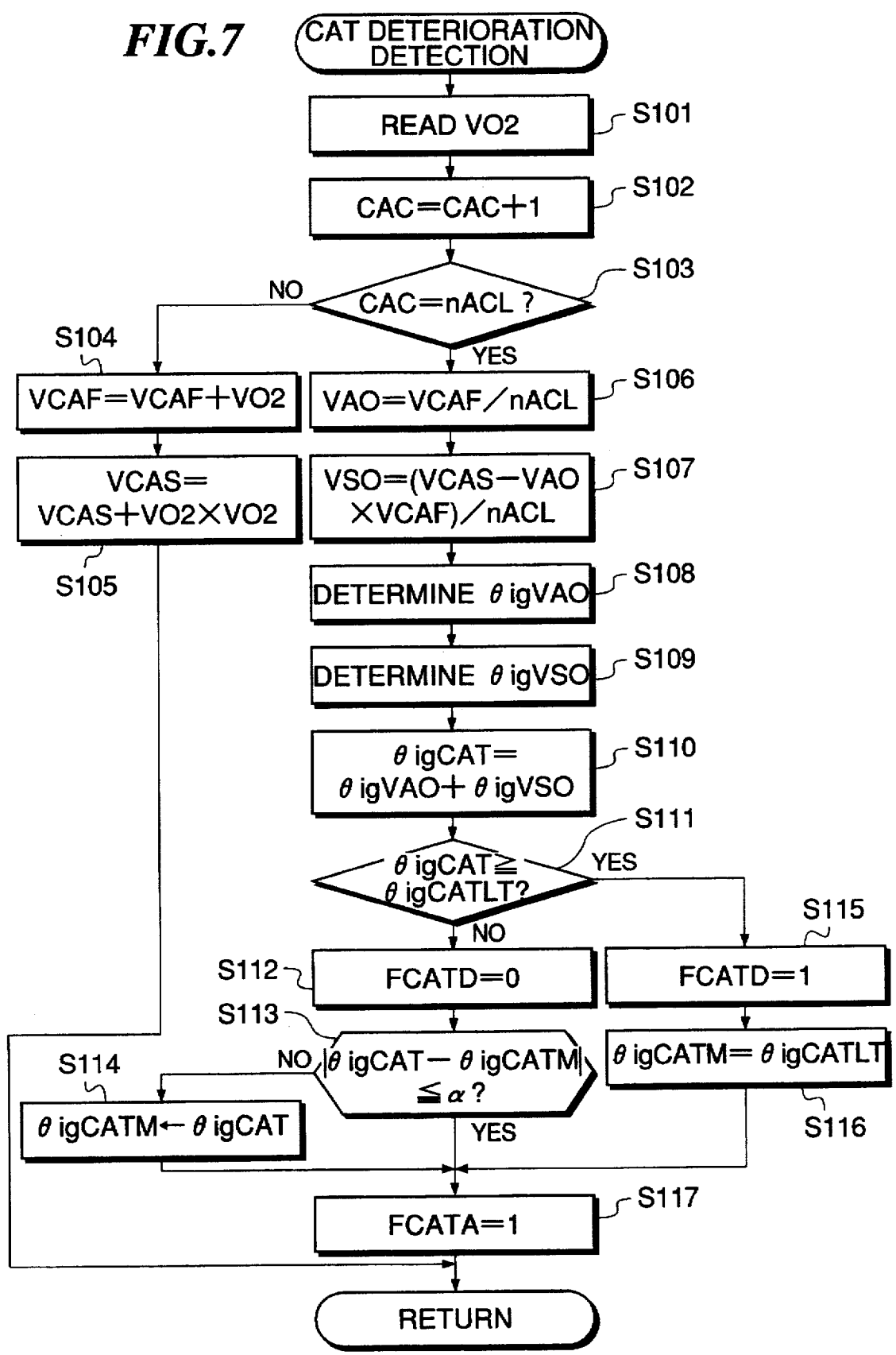
FIG. 7 is a flowchart showing a subroutine for detecting deterioration of the catalyst, which is executed during execution of the main routine of FIG. 6.

According to the FIG. 6 main routine, the catalyst deterioration detection is carried out by the routine of FIG. 7 only when a predetermined time period has elapsed after the start of the engine, the engine is in a predetermined operating condition wherein the engine coolant temperature TW and the catalyst bed temperature TC are higher than respective predetermined values, the engine rotational speed NE and the intake pipe absolute pressure PBA are within respective predetermined ranges, and at the same time the catalyst deterioration detection has not been carried out after the start of the engine. Since the catalyst deterioration detection is carried out when the engine is in the predetermined operating condition in which the catalyst deterioration detection can be made by the use of the output from the O2 sensor which is then stable, i.e. when the air-fuel ratio feedback control is being effected, accurate detection results can be obtained. Further, when the answer at the step S94 is negative (NO), it means that the catalyst deterioration detection has already been carried out, making it unnecessary to carry out the detection again.

FIG. 7 shows details of the catalyst deterioration detection routine which is executed at the step S95 in the FIG. 7 main routine in synchronism with generation of TDC signal pulses.

First, at a step S101, the output value VO2 from the O2 sensor 17 is read in, and the determination time period variable CAC is incremented by "1" at a step S102, followed by the program proceeding to a step S103, wherein it is determined whether or not the determination time period variable CAC has reached a predetermined value nACL. The predetermined value nACL is set to a value corresponding to a sufficiently long time period within which the average value can be calculated (e.g. 1024).

In the first loop of execution of the present routine, the answer to the question at the step S103 is negative (NO), and then the program proceeds to a step S104, wherein a present value of the VO2 output value from the O2 sensor 17 is added to the VCAF value set at the step S87 in FIG. 6 to obtain a present value of the integrated value VCAF. Then, at a step S105 a present value of the VO2 output value squared is added to the squared integrated value VCAS (=0) set at the step S88 in FIG. 6 to obtain a new squared integrated value VCAS, followed by terminating the program and returning to the FIG. 6 main routine.

When the program proceeds to the steps S104 et seq. in the following loop or a subsequent loop, a present value of the VO2 output value is added to an immediately preceding value of the integrated value VCAF to obtain a present value of the integrated value VCAF at the step S104, and then a present value of the VO2 output value squared is added to an immediately preceding value of the squared integrated value VCAS to obtain a new squared integrated value VCAS.

On the other hand, if the answer to the question at the step S103 becomes affirmative (YES), the program proceeds to a step S106, wherein the average value VAO is calculated by the use of the following equation (7), and then the variance value VSO is calculated by the use of the following equation (8) at a step S107:

$$VAO = VCAF/nACL \quad (7)$$

$$VSO = (VCAS - VAO \times VCAF)/nACL \quad (8)$$

Then, to calculate an ignition timing retardation amount θigCAT, an ignition timing-retarding correction value θigVAO and an ignition timing-retarding correction value θigVAO are determined at respective steps S108 and S109.

Figure 8:
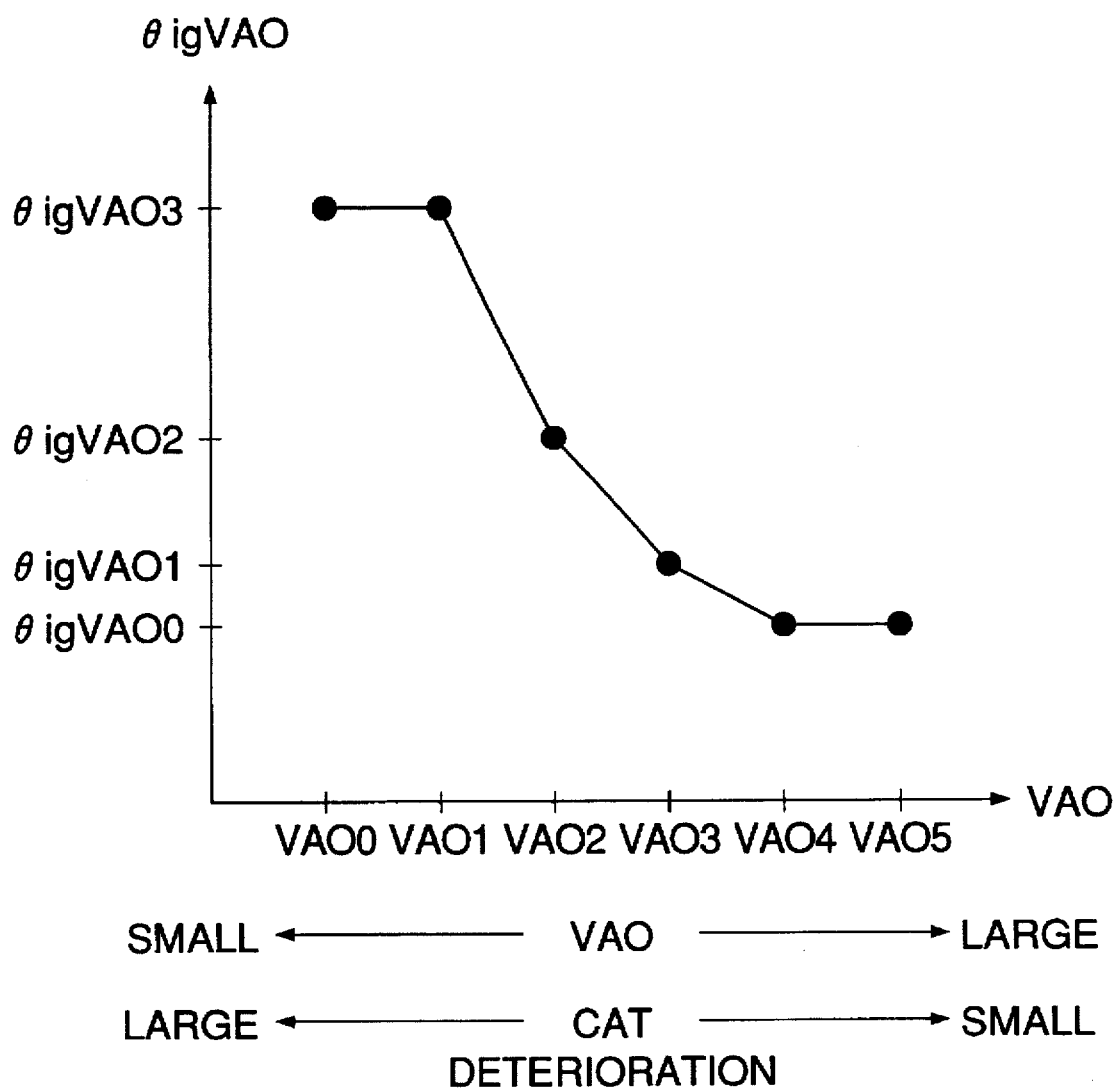
FIG. 8 shows a table for determining an ignition timing-retarding correction value $\theta igVAO$, which is retrieved during execution of the FIG. 7 subroutine.

More specifically, the correction value θigVAO is set, as shown in FIG. 8, such that table values θigVAO0 to θigVAO3 are provided in a manner corresponding, respectively, to predetermined values VAO0 to VAO5 of the average value VAO. The θigVAO value is determined by being read from the table and additionally by interpolation, if required.

As mentioned above, as the average output value VAO is smaller, the degree of deterioration of the catalyst is larger, and accordingly the correction value θigVAO is set to a larger value.

Figure 9:
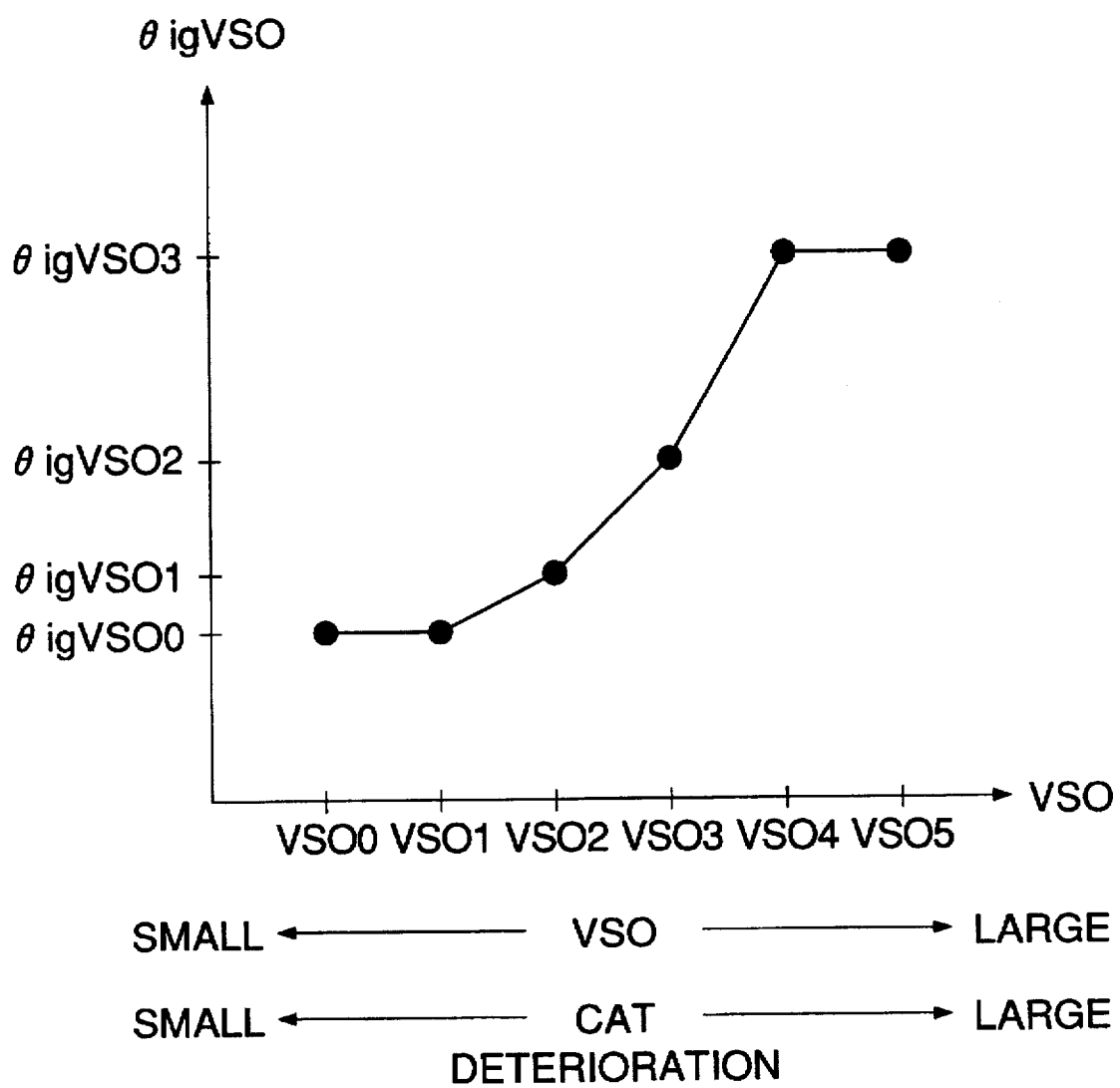
FIG. 9 shows a table for determining an ignition timing-retarding correction value $\theta igVSO$, which is retrieved during execution of the FIG. 7 subroutine.

On the other hand, the ignition timing-retarding correction value θigVAO is set, as shown in FIG. 9, such that table values θigVAO0 to θigVSO3 are provided in a manner corresponding, respectively, to predetermined values VSO0 to VSO5 of the variance value VSO. The θigVSO value is determined by being read from the table and additionally by interpolation, if required.

As mentioned above, as the variance value VSO is larger, the degree of deterioration of the catalyst is larger, and accordingly the correction value θigVSO is set to a larger value.

Then, at a step S110, the thus determined correction values θigVAO and θigVAO are added together to obtain the retardation amount θigCAT.

At a step S111, it is determined whether or not the thus calculated retardation amount θigCAT is larger than a predetermined limit value θigCATLT. If the answer is negative (NO), i.e. if the retardation amount θigCAT is smaller than the predetermined limit value θigCATLT, it is determined that the degree of catalyst deterioration is within a tolerance, followed by setting a flag FCATAD to "0" at a step S112 to indicate that the degree of catalyst deterioration is outside the tolerance. Then, at a step S113, the absolute value of a difference between the above calculated retardation amount θigCAT and a stored retardation amount θigCATM, which is stored in the memory means 5c, is compared with a predetermined value α. If the absolute value is equal to or smaller than the predetermined value α, the deterioration detection flag FCATA is set to "1" at a step S117, followed by terminating the present routine to return to the main routine of FIG. 6. The stored retardation amount θigCATM is initially set to an initial value of 0. If the θigCATM value is stored in a non-volatile RAM or the like forming the memory means 5c, a value of θigTCATM can be obtained, which reflects manufacturing tolerances and aging changes of the engine, the exhaust gas component concentration sensors and the control system, to thereby obtain a more proper ignition timing retardation amount.

On the other hand, if the absolute value of the difference between the newly calculated retardation amount θigCAT and the stored retardation amount θigCATM exceeds the predetermined value α, the stored value θigCATM is updated to the newly calculated retardation amount θigCAT at a step S114, which makes it possible to always obtain the optimum ignition timing retardation amount. Then, the catalyst deterioration detection flag FCATA is set to "1" at the step S117, followed by terminating the present routine to return to the main routine of FIG. 6.

If the answer to the question at the step S111 is affirmative YES), i.e. if the above calculated retardation amount θigCAT exceeds the predetermined limit value θigCATLT, it is determined that the degree of catalyst deterioration is outside the tolerance, and then the flag FCATAD is set to "1" at a step S115, to indicate that the degree of catalyst deterioration is outside the tolerance. Thus, the predetermined limit value θigCATLT is stored as the stored value θigCATM of the retardation amount at a step S116, to thereby avoid excessive retardation of the ignition timing. Then, the catalyst deterioration detection flag FCATA is set to "1" at the step S117, followed by terminating the present program to return to the main routine of FIG. 6.

Figure 10:
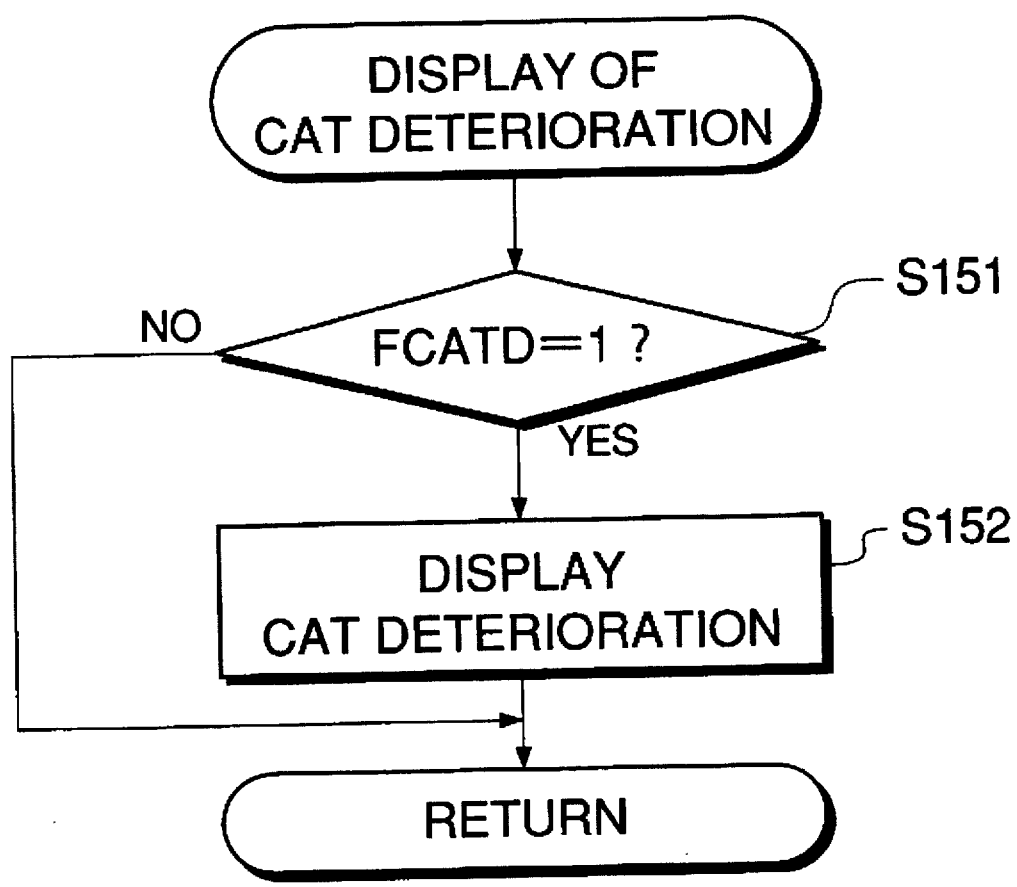
FIG. 10 is a flowchart showing a subroutine for displaying the catalyst deterioration.

FIG. 10 shows a routine for displaying the catalyst deterioration. This program is executed at predetermined time intervals in synchronism with counting of a timer.

First, it is determined whether or not the flag FCATAD is set to "1". If the answer is affirmative (YES), i.e. if the degree of catalyst deterioration is outside the tolerance, the catalyst deterioration is displayed on a display, not shown, arranged on an installment panel or the like, in the compartment of the vehicle, at a step S152, followed by terminating the present program.

On the other hand, if the answer to the question at the step S151 is negative (NO), i.e. if the degree of catalyst deterioration is within the tolerance, the program is terminated without displaying the detected catalyst deterioration.

According to the embodiment described above, the degree of deterioration of the catalyst is detected by at least one of the average output value VAO and the variance value VSO, which have been calculated based on the output value from the O2 sensor 17. Therefore, it is possible to carry out the catalyst deterioration detection at the same time of execution of the air-fuel ratio feedback control, that is, without interrupting the air-fuel ratio feedback control, to thereby secure required air-fuel ratio feedback control performance and hence avoid a degradation in exhaust emission characteristics of the engine. Further, it is no longer necessary to measure a time period elapsed before the output level of the O2 sensor 17 is inverted as in the prior art, thus shortening the time period required for the catalyst deterioration detection.

Besides, according to the above described embodiment, both the average value VAO and the variance value VSO are used to calculate the ignition timing retardation amount θigCAT, obtaining a more accurate value θigCAT.

In addition, according to the present embodiment, the above calculated ignition timing retardation amount θigCAT is employed not only for determination as to catalyst deterioration at the step S111 in FIG. 7, but also for retardation of the ignition timing at a step S210 in FIG. 11, referred to hereinafter, by using the stored retardation amount θigCATM mentioned at the steps S113, S114 and S116 in FIG. 7, which contributes to simplification of the construction of the system.

In the above described embodiment, the air-fuel ratio correction value ΔKCMD may be employed in place of the output value VO2 from the O2 sensor. In this alternative case, advantageously the average value VAO and variance value VSO for determination of the catalyst deterioration may be replaced by an average value of the air-fuel ratio correction value ΔKCMD and a variance value thereof, which are calculated when VO2<VL or VO2>VH, providing similar detection results to those obtained by the above described embodiment.

Moreover, a standard deviation may be employed in place of the variance value to determine the output fluctuation width of the O2 sensor 17. In this alternative case, advantageously an average value of the output value VO2 from the O2 sensor ( or the air-fuel ratio correction value ΔKCMD) and a standard deviation thereof are calculated, and the calculated average value and standard deviation are compared with respective predetermined values to thereby evaluate deterioration of the catalyst.

Figure 11:
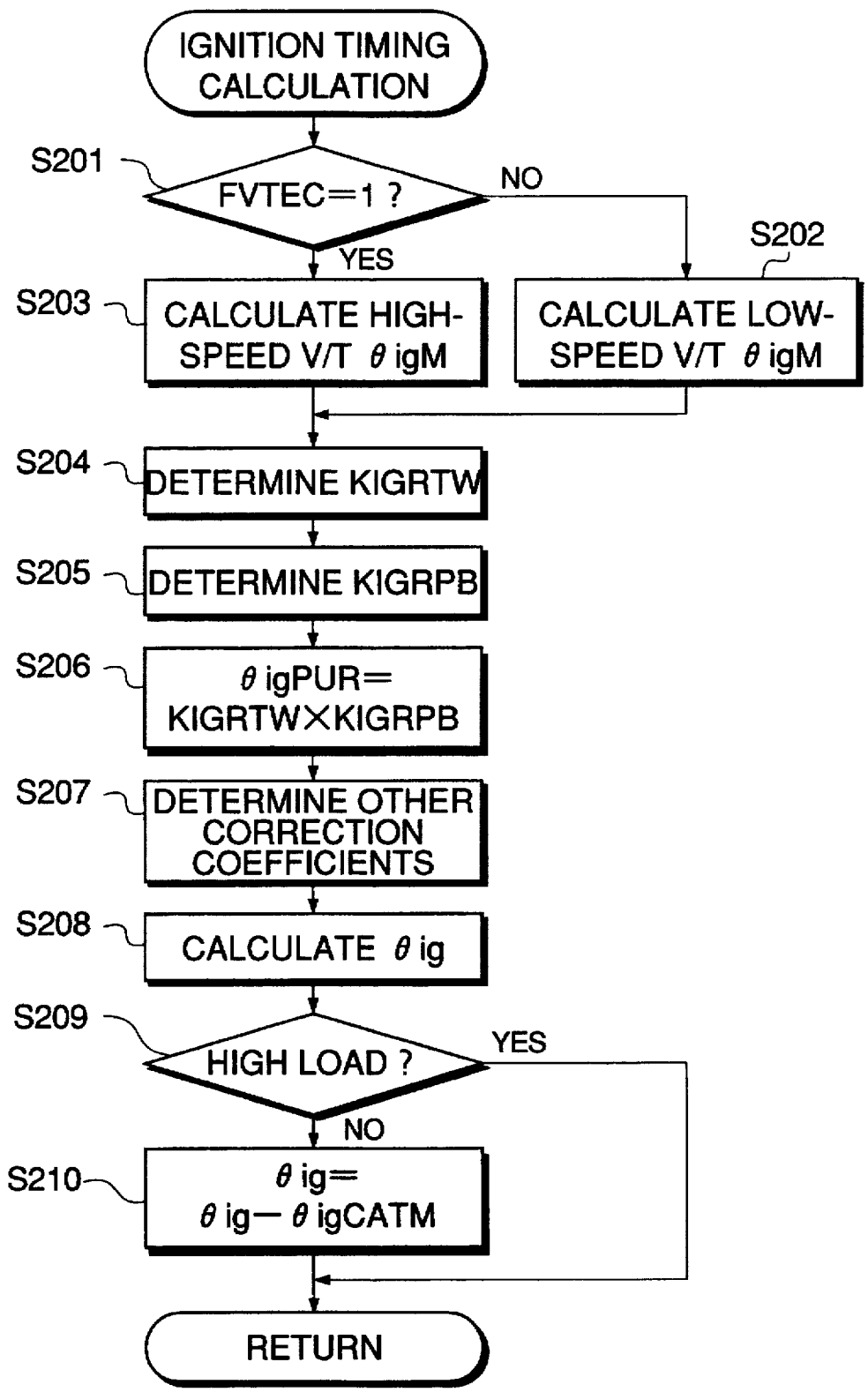
FIG. 11 is a flowchart showing a routine for calculating the ignition timing.

FIG. 11 shows a routine for calculating the ignition timing, which is executed in synchronism with generation of TDC signal pulses.

First, it is determined at a step S201 whether or not a flag FVTEC is set to "0" to determine whether the valve timing of the intake valves and exhaust valves is set to the high-speed V/T or to the low-speed V/T. If the flag FVTEC is set to "0", i.e. if the valve timing is set to the low-speed V/T, the program proceeds to a step S202, wherein a θig map suitable for the low-speed V/T is retrieved to determine the basic ignition timing θigM suitable for the low-speed V/T. On the other hand, if the flag FVTE is set to "1", i.e. if the valve timing is set to the high-speed V/T, the program proceeds to a step S203, wherein a θig map suitable for the high-speed V/T is retrieved to determine the basic ignition timing θigM suitable for the high-speed V/T. In other words, to determine the basic ignition timing θigM, the two θig maps for the low-speed V/T (θigML map) and the high-speed V/T (θigMH map) are stored in the ROM of the memory means 5c. The basic ignition timing θigM is read out by retrieving one of the θig maps and additionally by interpolation, if required.

Then, at a step S204, a KIGRTW table is retrieved to determine a coolant temperature-dependent correction coefficient KIGRTW.

The KIGRTW table, not shown, is set such that table values KIGRTW0 to KIGRTW5 are provided in a manner corresponding, respectively, to predetermined values TW0 to TW7 of the engine coolant temperature TW. More specifically, the KIGRTW table is set such that the KIGRTW values becomes smaller as the engine coolant temperature TW rises, and the KIGRTW value is determined by being read from the table and additionally by interpolation, if required. Thus, when the engine coolant temperature TW is low, the the KIGRTW value is set to a larger value, and accordingly, the retardation amount θig is made larger.

Then, at a step S205, a KIGRPB table is retrieved to determine an intake pressure-dependent correction coefficient KIGRPB.

The KIGRPB table is set such that table values KIGRPB0 to KIGRPB1 are provided in a manner corresponding, respectively, to predetermined values PBA0 to PBA3 of the intake pipe absolute pressure PBA. The intake pressure-dependent correction coefficient KIGRPB is determined by being read from the KIGRPB table and additionally by interpolation, if required.

At a step S206, a retardation value θigPUR is calculated by the use of the following equation (9):

$$\theta igPUR = KIGRTW \times KIGRPB \qquad (9)$$

Next, at a step S207, other correction values θigCR including an ignition timing advance value are calculated, and then at a step S208, the ignition timing θig is calculated by the use of the following equation (10):

$$\theta ig = \theta igM + \theta igCR - \theta igPUR \qquad (10)$$

Thus, the ignition timing is corrected to a retarded value at least based on the engine coolant temperature TW and the intake pipe absolute pressure PBA, so that the ignition timing of the engine is controlled to the thus retarded optimum ignition timing. As a result, even if a large amount of evaporative fuel is drawn into the combustion chamber of the engine 1, degraded exhaust emission characteristics and degraded drivability of the engine can be avoided.

Then, the program proceeds to a step S209, wherein it is determined whether or not the engine is in a high load condition. If it is determined that the engine is in the high load condition, the program is immediately terminated to inhibit the retardation of the ignition timing to be carried out at the step S210. Thus, an excessive rise in the temperature of exhaust gases supplied to the catalyst can be restrained, to thereby prevent overheating of the catalyst.

On the other hand, if it is determined at the step S209 that the engine is not in the high load condition, the program proceeds to the step S210, wherein ignition timing retardation is carried out. More specifically, the stored ignition timing retardation amount θigCATM stored at the step S116 in FIG. 7 is subtracted from the ignition timing θig calculated at the step S208 to thereby calculate the final ignition timing θig. Then, the present program is terminated.

Figure 12:
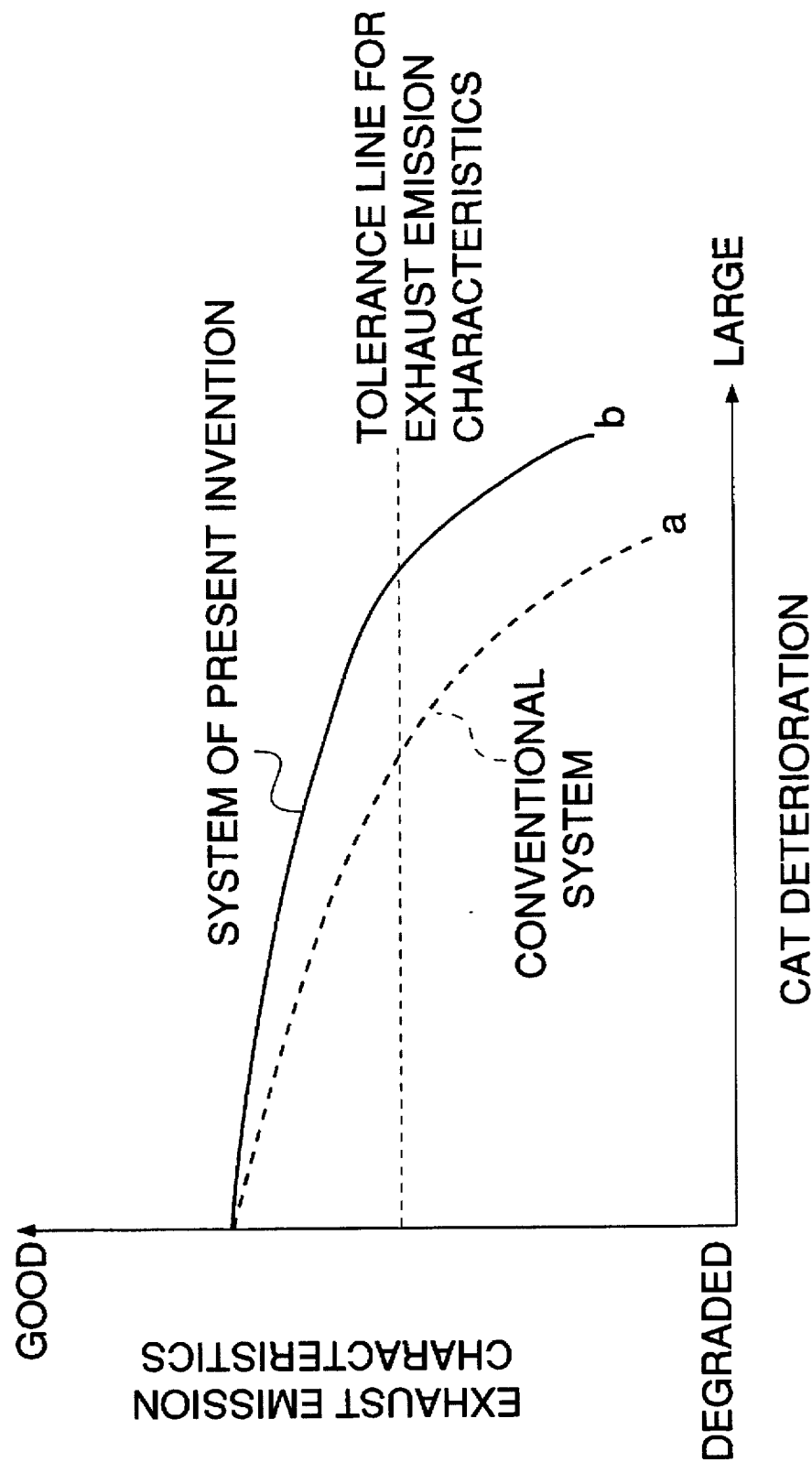
FIG. 12 is a graph showing the relationship between the degree of deterioration of catalysts employed in the prior art and the present invention and exhaust emission characteristics of the engine.

FIG. 12 shows the relationship between the degree of deterioration of the catalyst and exhaust emission characteristics of the engine, according to the conventional system and the catalyst deterioration-detecting system of the present embodiment. As is clear from the figure, the system according to the above described embodiment can control the exhaust emission characteristics, i.e. emission amounts of HC and NOx to a better level than those controlled by the conventional system when the catalysts of the two systems are deteriorated to the same degree.

The invention is not limited to the above described embodiment, but any variations and modifications are possible within the scope of the appended claims without departing from the spirit of the invention. For example, although in the above described embodiment, a single catalyst is provided, the catalyst deterioration-detecting system according to the invention may be applied to an internal combustion engine which is provided with a first catalyst and a second catalyst, wherein detection of the catalyst deterioration may be carried out by the use of an average value and an output fluctuation width value of an output value from an O2 sensor arranged between the two catalysts, or those of an air-fuel ratio correction value based on the sensor output value.

What is claimed is:

1. A catalyst deterioration-detecting system for an internal combustion engine having an exhaust passage, at least one catalyst means arranged in said exhaust passage for purifying noxious components present in exhaust gases emitted from said engine, exhaust gas component concentration sensor means arranged in said exhaust passage at a location downstream of said catalyst means, for detecting concentration of a specific component in said exhaust gases, and ignition timing control means for controlling ignition timing of said engine, the system comprising:

catalyst deterioration-detecting means for detecting a degree of deterioration of said catalyst means, based on an output value from said exhaust gas component concentration sensor means;

ignition timing retardation amount-calculating means for calculating an ignition timing retardation amount according to said degree of deterioration of said catalyst means detected by said catalyst deterioration-detecting means;

retardation amount-storing means for storing said ignition timing retardation amount calculated by said ignition timing retardation amount-calculating means;

ignition timing-calculating means for calculating ignition timing of said engine according to operating conditions of said engine; and ignition timing-retarding means for retarding said ignition timing of said engine calculated by said ignition timing-calculating means by said ignition timing retardation amount stored by said retardation amount-storing means.

2. A catalyst deterioration-detecting system as claimed in claim 1, wherein said ignition timing-retarding means limits the calculated ignition timing retardation amount to a predetermined limit value when the calculated ignition timing retardation amount exceeds said predetermined limit value.

3. A catalyst deterioration-detecting system as claimed in claim 2, including catalyst deterioration-displaying means for displaying said degree of deterioration of said catalyst means detected by said catalyst deterioration-detecting means when the calculated ignition timing retardation amount exceeds said predetermined limit value.

4. A catalyst deterioration-detecting system as claimed in any of claims 1 to 3, including high load condition-detecting means for detecting a predetermined high load condition of said engine, and retardation-inhibiting means for inhibiting the ignition timing retardation when said predetermined high load condition of said engine is detected by said high load condition-detecting means.

5. A catalyst deterioration-detecting system as claimed in any of claims 1 to 3, including retardation amount-updating means for updating said ignition timing retardation amount stored by said retardation amount-storing means when a difference between said ignition timing retardation amount stored by said retardation amount-storing means and an ignition timing retardation amount newly calculated by said ignition timing retardation amount-calculating means.

6. A catalyst deterioration-detecting system as claimed in claim 4, including retardation amount-updating means for updating said ignition timing retardation amount stored by said retardation amount-storing means when a difference between said ignition timing retardation amount stored by said retardation amount-storing means and an ignition timing retardation amount newly calculated by said ignition timing retardation amount-calculating means exceeds a predetermined value.

7. A catalyst deterioration-detecting system as claimed in any of claims 1 to 3, wherein said catalyst deterioration-detecting means includes average value-calculating means for calculating an average value of said output value from said exhaust gas component concentration-detecting means, and fluctuation width-calculating means for calculating a fluctuation width of said output value from said exhaust gas component concentration-detecting means, said catalyst deterioration-detecting means detecting said degree of deterioration of said catalyst means, based on at least one of said average value and said fluctuation width thus calculated.

8. A catalyst deterioration-detecting system as claimed in claim 4, wherein said catalyst deterioration-detecting means includes average value-calculating means for calculating an average value of said output value from said exhaust gas component concentration-detecting means, and fluctuation width-calculating means for calculating a fluctuation width of said output value from said exhaust gas component concentration-detecting means, said catalyst deterioration-detecting means detecting said degree of deterioration of said catalyst means, based on at least one of said average value and said fluctuation width thus calculated.

9. A catalyst deterioration-detecting system as claimed in claim 5, wherein said catalyst deterioration-detecting means includes average value-calculating means for calculating an average value of said output value from said exhaust gas component concentration-detecting means, and fluctuation width-calculating means for calculating a fluctuation width of said output value from said exhaust gas component concentration-detecting means, said catalyst deterioration-detecting means detecting said degree of deterioration of said catalyst means, based on at least one of said average value and said fluctuation width thus calculated.

10. A catalyst deterioration-detecting system as claimed claim 7, wherein said ignition timing retardation amount-calculating means calculates said ignition timing retardation amount, based on at least one of said average value calculated by said average value-calculating means and said fluctuation width calculated by said fluctuation width-calculating means.

11. A catalyst deterioration-detecting system as claimed in claim 10, wherein said ignition timing retardation amount-calculating means sets said ignition timing retardation amount to a larger value as said average value calculated by said average value-calculating means is smaller.

12. A catalyst deterioration-detecting system as claimed in claim 10, wherein said ignition timing retardation amount-calculating means sets said ignition timing retardation amount to a larger value as said fluctuation width calculated by said fluctuation width-calculating means is larger.

* * * * *